J. ZIMMERMAN.
WHIFFLETREE.
No. 173,749.  Patented Feb. 22, 1876.
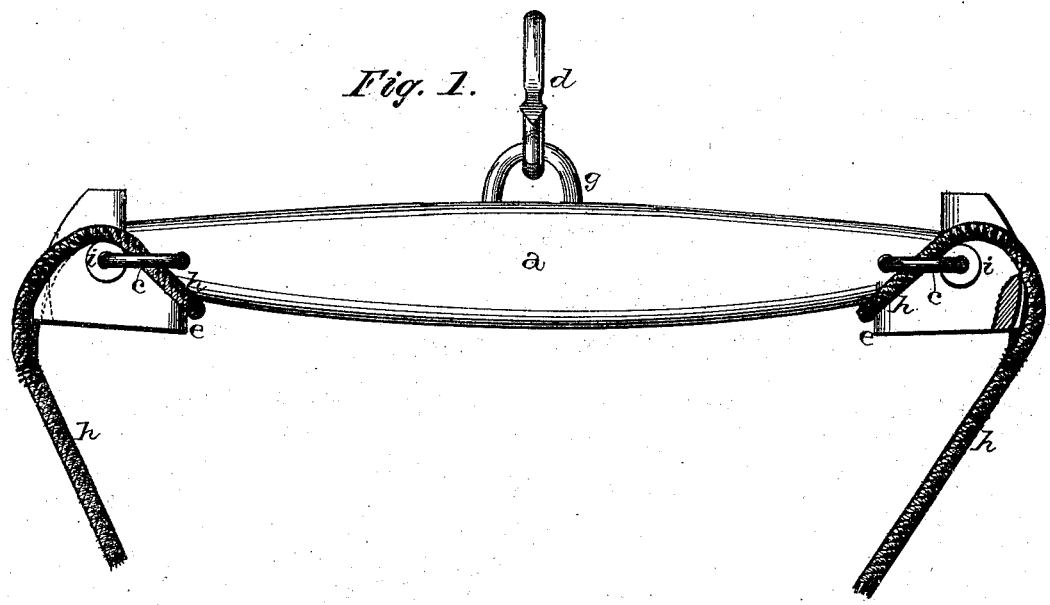
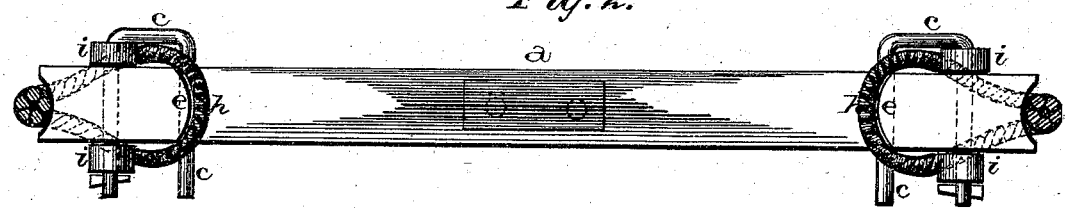

UNITED STATES PATENT OFFICE.

JACOB ZIMMERMAN, OF MILLVILLE, NEW JERSEY.

IMPROVEMENT IN WHIFFLETREES.

Specification forming part of Letters Patent No. 173,749, dated February 22, 1876; application filed January 27, 1876.

*To all whom it may concern:*

Be it known that I, JACOB ZIMMERMAN, of Millville, in the county of Cumberland and State of New Jersey, have invented certain new and useful Improvements in Whiffletrees; and I do hereby declare the following to be a full, clear, and exact description of the invention, such as will enable others skilled in the art to which it pertains to make and use it, reference being had to the accompanying drawings, which form part of this specification.

My invention relates to an improvement in whiffletrees; and it consists in the arrangement and combination of parts that will be more fully described hereinafter.

The accompanying drawings represent my invention.

$a$ represents a common whiffletree, which is provided with staple $g$ and hook $d$ on its rear side, for fastening it to other objects. Upon the front edge, near each end, is formed a shoulder, $e$, around which the trace catches, so as to prevent it from slipping off. The ends of this trace are permanently attached to the tree, as it is intended to either unhook the tree $a$ itself, or else loosen the front ends of the traces, as may be preferred. Driven down through the top side of this single-tree, at each end, is the staple $c$, which straddles over the trace, as shown, so as to hold it securely in position. The ends of these staples pass down some distance below the lower side, and upon one of the prongs, both above and below the whiffletree, are placed the washers $i$, of any suitable material, which prevent the trace from chafing and wearing. This trace $h$ may consist of a rope, leather, or rawhide, and, after being passed around the shoulders and staples, has its loose ends secured to the other portion, as shown, and is made to pass over the ends of the whiffletree, so as to form a guard for trees, shrubs, and plants.

Where the ends are not protected in this manner, whenever they strike against trees or other growing plants, they bark, bruise, and injure them, and often kill them.

Having thus described my invention, I claim—

The combination of the whiffletree $a$, having the shoulders $e$, staples $g$, and trace $h$, substantially as described.

In testimony that I claim the foregoing I have hereunto set my hand and seal this 19th day of January, 1876.

JACOB ZIMMERMAN. [L. S.]

Witnesses:
PETER G. LUDLAM,
H. F. SOCWELL.